(12) United States Patent
Shimotsu

(10) Patent No.: US 12,111,560 B2
(45) Date of Patent: Oct. 8, 2024

(54) IMAGING LENS AND IMAGING APPARATUS

(71) Applicant: FUJIFILM Corporation, Tokyo (JP)

(72) Inventor: Shinichi Shimotsu, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 871 days.

(21) Appl. No.: 17/208,013

(22) Filed: Mar. 22, 2021

(65) Prior Publication Data

US 2021/0208476 A1    Jul. 8, 2021

Related U.S. Application Data

(63) Continuation of application No. PCT/JP2019/033450, filed on Aug. 27, 2019.

(30) Foreign Application Priority Data

Nov. 6, 2018 (JP) .................................. 2018-209284

(51) Int. Cl.
*G03B 11/00* (2021.01)
*G02B 1/10* (2015.01)
(Continued)

(52) U.S. Cl.
CPC ............... *G03B 11/00* (2013.01); *G02B 1/10* (2013.01); *G02B 5/208* (2013.01); *G02B 5/281* (2013.01);
(Continued)

(58) Field of Classification Search
CPC ........ G03B 11/00; G03B 13/36; G03B 17/12; G02B 1/10; G02B 5/208; G02B 5/281;
(Continued)

(56) References Cited

U.S. PATENT DOCUMENTS 6,301,042 B1    10/2001  Pelekhaty
8,525,088 B1 *   9/2013  Ell ........................ F41G 7/2226
                                                    244/3.17

(Continued)

FOREIGN PATENT DOCUMENTS

CN        107976733 A      5/2018
JP      2004-103964 A      4/2004
(Continued)

OTHER PUBLICATIONS

An Office Action issued by the State Intellectual Property Office of the People's Republic of China on Jun. 30, 2022, which corresponds to Chinese Patent Application No. CN 201980068029.4.

(Continued)

*Primary Examiner* — Shahbaz Nazrul
(74) *Attorney, Agent, or Firm* — Studebaker & Brackett PC

(57) ABSTRACT

An imaging lens including: a plurality of lenses; and a coating provided on at least a part of the plurality of lenses. In a near-infrared light wavelength region, by the coating, light transmittance on a short wavelength side of a near-infrared light peak wavelength region including 1550 nm is reduced from light transmittance at a short wavelength end of the near-infrared light peak wavelength region as a wavelength is decreased, and light transmittance on a long wavelength side of the near-infrared light peak wavelength region is reduced from light transmittance at a long wavelength end of the near-infrared light peak wavelength region as the wavelength is increased.

19 Claims, 8 Drawing Sheets

(51) Int. Cl.

| | |
|---|---|
| *G02B 5/20* | (2006.01) |
| *G02B 5/28* | (2006.01) |
| *G02B 7/00* | (2021.01) |
| *G02B 7/09* | (2021.01) |
| *G02B 15/14* | (2006.01) |
| *G03B 13/36* | (2021.01) |
| *G03B 17/12* | (2021.01) |
| *H04N 23/11* | (2023.01) |

(52) U.S. Cl.
CPC ............... *G02B 7/006* (2013.01); *G02B 7/09* (2013.01); *G02B 15/14* (2013.01); *G03B 13/36* (2013.01); *G03B 17/12* (2013.01); *H04N 23/11* (2023.01)

(58) Field of Classification Search
CPC .......... G02B 7/006; G02B 7/09; G02B 15/14; G02B 5/285; G02B 7/102; G02B 26/007; H04N 23/11; H04N 23/00
See application file for complete search history.

(56) References Cited

U.S. PATENT DOCUMENTS

| | | | |
|---|---|---|---|
| 2002/0063952 A1 | 5/2002 | Nyman et al. | |
| 2002/0163585 A1 | 11/2002 | Machii et al. | |
| 2003/0223648 A1 | 12/2003 | Albrecht et al. | |
| 2016/0349420 A1* | 12/2016 | Chang | G02B 5/206 |
| 2017/0205198 A1* | 7/2017 | Roncone | F41G 7/226 |
| 2017/0272709 A1 | 9/2017 | Hagiwara et al. | |
| 2018/0196179 A1 | 7/2018 | Takishita et al. | |
| 2018/0216992 A1 | 8/2018 | Trent et al. | |
| 2020/0126220 A1* | 4/2020 | Kashima | A61B 1/0646 |

FOREIGN PATENT DOCUMENTS

| | | |
|---|---|---|
| JP | 2004-215210 A | 7/2004 |
| JP | 2006-033716 A | 2/2006 |
| JP | 2008-070828 A | 3/2008 |
| KR | 10-0770689 B1 | 10/2007 |
| WO | 99/36811 A1 | 7/1999 |
| WO | 2010/143458 A1 | 12/2010 |
| WO | 2016/052101 A1 | 4/2016 |

OTHER PUBLICATIONS

An Office Action mailed by the China National Intellectual Property Administration on Sep. 28, 2023, which corresponds to Chinese Patent Application No. 201980068029.4 and is related to U.S. Appl. No. 17/208,013; with English translation.

The partial supplementary European search report (R. 164EPC) issued by the European Patent Office on Dec. 9, 2021, which corresponds to European Patent Application No. 19882144.9-1020 and is related to U.S. Appl. No. 17/208,013.

International Search Report issued in PCT/JP2019/033450; mailed Oct. 29, 2019.

Written Opinion issued in PCT/JP2019/033450; mailed Oct. 29, 2019.

An Office Action mailed by China National Intellectual Property Administration on Jan. 28, 2023, which corresponds to Chinese Patent Application No. 201980068029.4 and is related to U.S. Appl. No. 17/208,013; with English language translation.

Communication pursuant to Article 94(3) EPC issued by the European Patent Office on Dec. 23, 2022, which corresponds to European Patent Application No. 19882144.9-1020 and is related to U.S. Appl. No. 17/208,013.

An Office Action; "Notice of Reasons for Refusal," mailed by the Japanese Patent Office on Sep. 5, 2023, which corresponds to Japanese Patent Application No. 2021-156697 and is related to U.S. Appl. No. 17/208,013; with English language translation.

The extended European search report issued by the European Patent Office on Mar. 18, 2022, which corresponds to European Patent Application No. 19882144.9-1020 and is related to U.S. Appl. No. 17/208,013.

Communication pursuant to Article 94(3) EPC issued by the European Patent Office on Jun. 7, 2023, which corresponds to European Patent Application No. 19882144.9-1020 and is related to U.S. Appl. No. 17/208,013.

* cited by examiner

«IMAGING LENS AND IMAGING APPARATUS

CROSS-REFERENCE TO RELATED APPLICATIONS

This application is a Continuation of PCT International Application No. PCT/JP2019/033450 filed on Aug. 27, 2019, which claims priority under 35 U.S.C § 119(a) to Japanese Patent Application No. 2018-209284 filed on Nov. 6, 2018. Each of the above application(s) is hereby expressly incorporated by reference, in its entirety, into the present application.

BACKGROUND OF THE INVENTION

1. Field of the Invention

The technology of the present disclosure relates to an imaging lens and an imaging apparatus.

2. Description of the Related Art

An imaging apparatus generally performs imaging with visible light. Other imaging apparatuses used for various applications have also been known. For example, there are imaging apparatuses such as a night-vision camera and a distance measurement camera that image light of a wavelength in a near-infrared light region.

In addition, an imaging apparatus capable of imaging in a wavelength region of both of the visible light and near-infrared light has been known. As an imaging element used in such an imaging apparatus, an imaging element capable of detecting light in a wavelength region of the visible light to the near-infrared light is used. For example, JP2004-103964A discloses an imaging apparatus using a complementary metal oxide semiconductor (CMOS) sensor or a charge coupled device (CCD) sensor. The imaging apparatus disclosed in JP2004-103964A is an imaging apparatus capable of imaging up to the near-infrared light region.

In addition, an imaging element having detection sensitivity to a wider near-infrared light region is exemplified by an InGaAs imaging element capable of detecting light in a wavelength region of 0.5 μm to 1.7 μm.

SUMMARY OF THE INVENTION

The imaging apparatus disclosed in JP2004-103964A can only image up to the near-infrared light region of up to 1.1 μm. In a case of imaging up to a longer wavelength region, it is necessary to use a semiconductor imaging element of InGaAs or the like.

One embodiment of the present disclosure provides an imaging lens capable of increasing, compared to an imaging lens having a wide light transmission region, light transmittance in a specific wavelength region within a near-infrared wavelength region, and an imaging apparatus using the imaging lens.

An imaging lens according to a first aspect comprises a plurality of lenses, in which in a near-infrared light wavelength region, by providing a coating on at least a part of the plurality of lenses, light transmittance on a short wavelength side of a near-infrared light peak wavelength region including 1550 nm (1.55 μm) is reduced from light transmittance at a short wavelength end of the near-infrared light peak wavelength region as a wavelength is decreased, and light transmittance on a long wavelength side of the near-infrared light peak wavelength region is reduced from light transmittance at a long wavelength end of the near-infrared light peak wavelength region as the wavelength is increased. Accordingly, the imaging lens according to the first aspect can increase the light transmittance in the specific wavelength region within a near-infrared wavelength, compared to the imaging lens having the wide light transmission region.

In the imaging lens according to a second aspect, light transmittance in the near-infrared light peak wavelength region is greater than or equal to 60%. According to the imaging lens according to the second aspect, since the light transmittance in the near-infrared light peak wavelength region is greater than or equal to 60%, the light transmittance in the specific wavelength region within the near-infrared wavelength can be increased, compared to the imaging lens having the wide light transmission region.

In the imaging lens according to a third aspect, in a visible light wavelength region, by providing the coating on at least a part of the plurality of lenses, light transmittance on a short wavelength side of a visible light peak wavelength region including a range of 500 nm to 650 nm is reduced from light transmittance at a short wavelength end of the visible light peak wavelength region as the wavelength is decreased, and light transmittance on a long wavelength side of the visible light peak wavelength region is reduced from light transmittance at a long wavelength end of the visible light peak wavelength region as the wavelength is increased. According to the imaging lens according to the third aspect, by having the visible light peak wavelength region including the range of 500 nm to 650 nm, the light transmittance in the specific wavelength region within the near-infrared wavelength can be increased.

In the imaging lens according to a fourth aspect, a first variable of at least one of a size or the number of ripples showing a characteristic of changes in light transmittance in the near-infrared light peak wavelength region is less than a corresponding second variable of a size or the number of ripples showing a characteristic of changes in light transmittance in the visible light peak wavelength region. According to the imaging lens according to the fourth aspect, by causing at least one of the size or the number of ripples in the near-infrared light peak wavelength region to be less than the corresponding size or the number of ripples of the light transmittance in the visible light peak wavelength region, the light transmittance in the specific wavelength region within the near-infrared wavelength can be increased.

In the imaging lens according to a fifth aspect, light transmittance in a wavelength region on a short wavelength side in a blue wavelength region included in the visible light wavelength region is lower than light transmittance in a wavelength region on a long wavelength side in the blue wavelength region. According to the imaging lens according to the fifth aspect, by causing the light transmittance in the wavelength region on the short wavelength side in the blue wavelength region included in the visible light wavelength region to be lower than the light transmittance in the wavelength region on the long wavelength side in the blue wavelength region, the light transmittance in the specific wavelength region within the near-infrared wavelength can be increased.

In the imaging lens according to a sixth aspect, the wavelength region on the short wavelength side in the blue wavelength region is a wavelength region of less than or equal to 450 nm. According to the imaging lens according to the sixth aspect, by causing light transmittance in the wavelength region of less than or equal to 450 nm in the blue wavelength region to be lower than light transmittance in a wavelength region of greater than 450 nm, the light transmittance in the specific wavelength region within the near-infrared wavelength can be increased.

In the imaging lens according to a seventh aspect, light transmittance in 400 nm to 430 nm is less than or equal to 50%. According to the imaging lens according to the seventh aspect, since the light transmittance in 400 nm to 430 nm is less than or equal to 50%, the light transmittance in the specific wavelength region within the near-infrared wavelength can be increased.

In the imaging lens according to an eighth aspect, by providing the coating on at least a part of the plurality of lenses, a low light transmittance region of lower light transmittance than the near-infrared light peak wavelength region and the visible light peak wavelength region is included between the near-infrared light peak wavelength region and the visible light peak wavelength region. According to the imaging lens according to the eighth aspect, by having the low light transmittance region of lower light transmittance than the near-infrared light peak wavelength region and the visible light peak wavelength region between the near-infrared light peak wavelength region and the visible light peak wavelength region, the light transmittance in the specific wavelength region within the near-infrared wavelength can be increased.

In the imaging lens according to a ninth aspect, the low light transmittance region is a wavelength region of 900 nm to 1100 nm, and light transmittance in this wavelength region is less than or equal to 5%. According to the imaging lens according to the ninth aspect, since the low light transmittance region is a wavelength region of 900 nm to 1100 nm, and the light transmittance in this wavelength region is less than or equal to 5%, the light transmittance in the specific wavelength region within the near-infrared wavelength can be increased.

In the imaging lens according to a tenth aspect, a light transmittance peak of a ⅓ wavelength of a fundamental wave that is generated from the fundamental wave having a light transmittance peak in the near-infrared light peak wavelength region due to interference caused by the coating is present in the visible light peak wavelength region. According to the imaging lens according to the tenth aspect, since the light transmittance peak of the ⅓ wavelength of the fundamental wave that is generated from the fundamental wave having the light transmittance peak in the near-infrared light peak wavelength region due to interference caused by the coating is present in the visible light peak wavelength region, the light transmittance in the specific wavelength region within the near-infrared wavelength can be increased.

The imaging lens according to an eleventh aspect further comprises an optical filter switching unit capable of arranging at least one of a first optical filter decreasing light transmittance of at least a part of visible light or a second optical filter decreasing light transmittance of at least a part of near-infrared light, on an optical path. According to the imaging lens according to the eleventh aspect, by including the optical filter switching unit capable of arranging at least one of the first optical filter decreasing the light transmittance of at least the part of visible light or the second optical filter decreasing the light transmittance of at least the part of near-infrared light on the optical path, resolution of a captured image can be increased.

In the imaging lens according to a twelfth aspect, a product of a refractive index and a thickness of the second optical filter is greater than a product of a refractive index and a thickness of the first optical filter. According to the imaging lens according to the twelfth aspect, since the product of the refractive index and the thickness of the second optical filter is greater than the product of the refractive index and the thickness of the first optical filter, a magnitude of a deviation between a focusing position for the visible light and a focusing position for the near-infrared light can be decreased.

In the imaging lens according to a thirteenth aspect, the optical filter switching unit arranged on an image formation side of a lens that is positioned closest to the image formation side among the plurality of lenses is included. According to the imaging lens according to the thirteenth aspect, an effect is obtained even in a case where the optical filter switching unit is present between the lens positioned closest to the image formation side and the imaging element.

The imaging lens according to a fourteenth aspect further comprises a control unit that has focusing position information indicating a focusing position in a case of arranging the first optical filter or the second optical filter on the optical path, and performs a control for changing a position of a focusing position adjustment lens between a case of arranging the first optical filter on the optical path and a case of arranging the second optical filter on the optical path, based on the focusing position information. According to the imaging lens according to the fourteenth aspect, it is possible to adjust a focal point in near-infrared light imaging.

The imaging lens according to a fifteenth aspect further comprises a zoom optical system. According to the imaging lens according to the fifteenth aspect, a target in a long range can be enlarged and imaged using the near-infrared light.

An imaging apparatus according to a sixteenth aspect comprises the imaging lens according to any one of the first aspect to the fifteenth aspect, and an InGaAs imaging element that images a subject through the imaging lens. According to the imaging apparatus according to the sixteenth aspect, by increasing the light transmittance in the specific wavelength region within the near-infrared wavelength, a captured image having higher resolution than in a case of using the imaging lens having the wide light transmission region can be obtained.

According to one embodiment of the present disclosure, the imaging lens capable of increasing, compared to the imaging lens having the wide light transmission region, the light transmittance in the specific wavelength region within the near-infrared wavelength region, and the imaging apparatus using the imaging lens are provided.

DESCRIPTION OF THE PREFERRED EMBODIMENTS

Embodiment

Hereinafter, one example of an embodiment of the technology of the present disclosure will be described with reference to the drawings.

First, terms used in the following description will be described. In the following description, the abbreviation "CPU" stands for "Central Processing Unit". The abbreviation "ROM" stands for "Read Only Memory". The abbreviation "DVD-ROM" stands for "Digital Versatile Disc-Read Only Memory". The abbreviation "RAM" stands for "Random Access Memory". The abbreviation "I/F" stands for "Interface". The abbreviation "HDD" stands for "Hard Disk Drive". The abbreviation "EEPROM" stands for "Electrically Erasable Programmable Read Only Memory". The abbreviation "CMOS" stands for "Complementary Metal Oxide Semiconductor". The abbreviation "CCD" stands for "Charge Coupled Device". The abbreviation "FPGA" stands for "Field-Programmable Gate Array". The abbreviation "PLD" stands for "Programmable Logic Device". The abbreviation "ASIC" stands for "Application Specific Integrated Circuit" (integrated circuit for a specific application). The abbreviation "SSD" stands for "Solid State Drive". The abbreviation "USB" stands for "Universal Serial Bus".

In the related art, it is known that an image having higher sharpness than an image captured using visible light is obtained in a case where particularly, a scene in a long range is imaged using near-infrared light. This is because a scattering amount caused by a fine particle present in the atmosphere is smaller for the near-infrared light than for the visible light. As a distance of light passing through the atmosphere is increased, the scattering amount is increased, and an amount of light traveling straight is reduced. Thus, as a distance from a target to an imaging position is increased, resolution of an image obtained by imaging (hereinafter, referred to as a "captured image") is decreased. The fact that the captured image having higher sharpness is obtained using the near-infrared light than using the visible light means that a degree of decrease in resolution is lower for the near-infrared light than for the visible light.

Scattering of light caused by the fine particle includes Rayleigh scattering and Mie scattering. The Rayleigh scattering is scattering caused by a fine particle having a significantly smaller diameter than a wavelength of light. The Mie scattering is scattering caused by a fine particle having a diameter relatively close to the wavelength of light. A scattering parameter a defined in Expression (1) below is an index of scattering.

$$\alpha = \pi d / \lambda \qquad (1)$$

Here, $\pi$ is the ratio of circumference to diameter, d is a particle diameter, and $\lambda$ is the wavelength of light. A mechanism of scattering of light of the wavelength $\lambda$ caused by a particle having the diameter d changes depending on the scattering parameter $\alpha$. A case of $\alpha \ll 1$ is the Rayleigh scattering. A case of $\alpha \approx 1$ is the Mie scattering.

Figure 11:
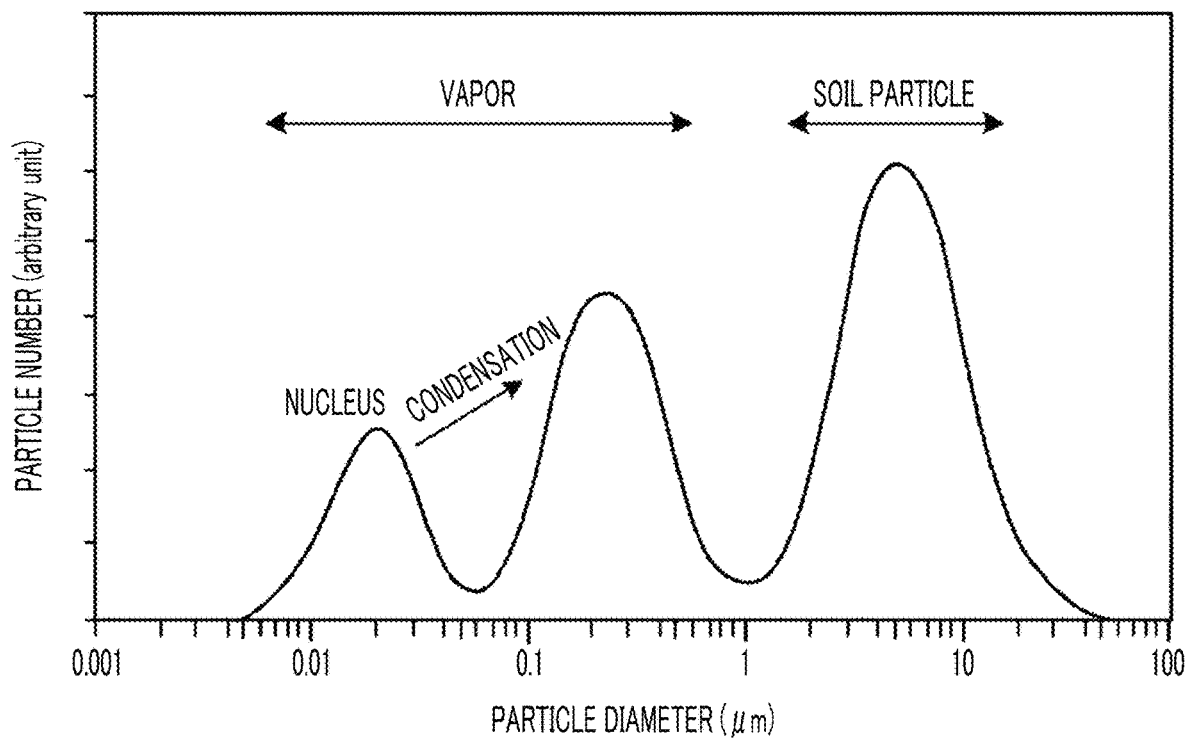
FIG. 11 is a diagram illustrating a particle number of fine particles in the atmosphere.

FIG. 11 illustrates a schematic distribution diagram of particle numbers of fine water droplets and fine dust included in the atmosphere. In FIG. 11, a horizontal axis is the diameter of the fine particle, and a vertical axis is the particle number of the fine particles in the atmosphere. As illustrated in FIG. 11, a peak of a fine vapor particle is mainly present between a few nm and a few tens of nm, and a hundred nm and a few hundred nm of the particle diameter. That is, it is known that an amount of presence of the fine vapor particle having a diameter in this range is large. Light passing through the atmosphere is mainly scattered by the Rayleigh scattering caused by the fine vapor particle having the former diameter and is scattered by the Mie scattering caused by the fine vapor particle having the latter diameter. Consequently, as an imaging distance of the imaging apparatus having the imaging lens is increased, an amount of light reaching the imaging lens included in the imaging apparatus is reduced. This reduction rate is higher for the visible light than for the near-infrared light. Accordingly, a captured image having higher resolution is obtained by imaging using the near-infrared light than by imaging using the visible light.

Figure 12:
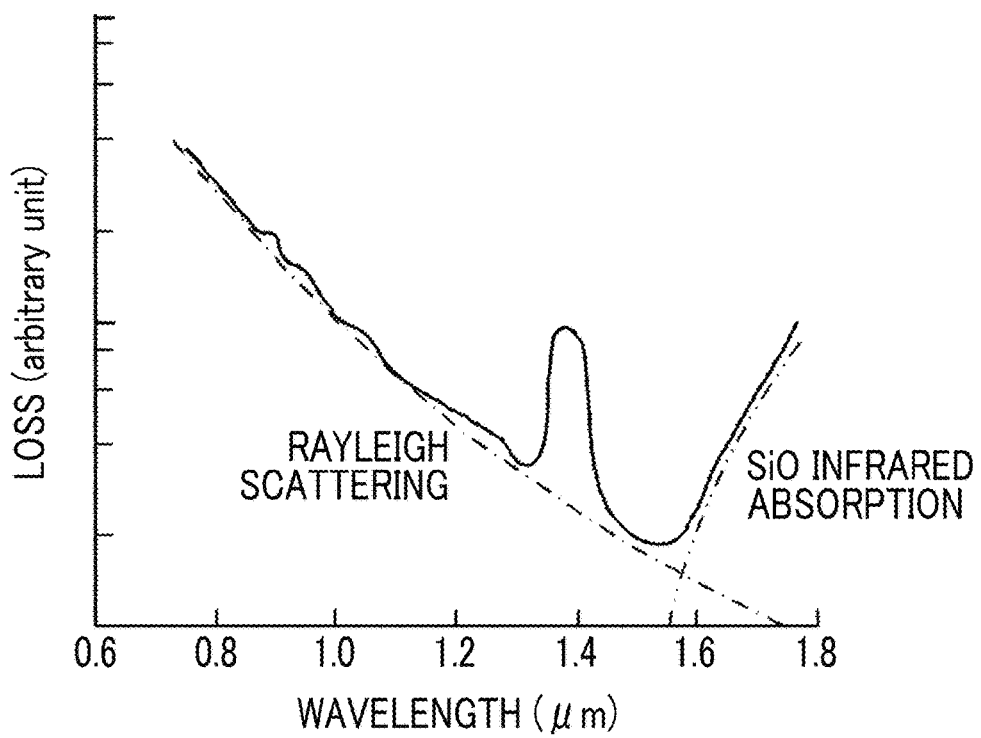
FIG. 12 is a diagram illustrating an optical loss amount due to absorption and scattering in the lens.

Meanwhile, light passing through the imaging lens used for imaging in the imaging apparatus is also subjected to scattering and absorption by an ingredient of the lens included in the imaging lens. As illustrated in FIG. 12, light passing through the lens is subjected to the Rayleigh scattering and infrared absorption by silicon dioxide that is a main ingredient of the lens. As illustrated by a chain line in the drawing, the Rayleigh scattering is decreased as the wavelength is increased. In addition, as illustrated by a chain double-dashed line in the drawing, for the infrared absorption caused by Si—O bonding, the absorption starts from around a wavelength of 1.55 μm, and the absorption is increased as the wavelength is increased. Strong absorption seen around a wavelength of 1.4 μm in the drawing is an absorption peak caused by a lens ingredient OFF.

As is perceived from FIG. 12, an amount of decrease (loss) in amount of light scattered and absorbed in the lens as a total of scattering and absorption illustrated by a solid line is the smallest in a range centered at a wavelength of 1.55 μm plus or minus around 0.1 μm. That is, transmittance of light centered at a wavelength of 1.55 μm plus or minus a wavelength of 0.1 μm is the highest.

In a case of the Rayleigh scattering, a scattering intensity is inversely proportional to the fourth power of the wavelength of scattered light. Based on this fact, in a case where Rayleigh scattering intensities of light of a wavelength of 1.55 μm and light of a wavelength of 0.553 μm that is the visible light are compared, the scattering intensity of the light of a wavelength of 1.55 μm is approximately 1/72 of the scattering intensity of the light of a wavelength of 0.553 μm.

In a case of the Mie scattering, in a case where forward scattering amounts of the Mie scattering of light of a wavelength of 1.55 μm and light of a wavelength of 0.77 μm are compared, a literature value of the scattering amount of the light of a wavelength of 1.55 μm is approximately 1/191 of the scattering amount of the light of a wavelength of 0.77 μm.

As described above, it is perceived that even in the near-infrared light, light of a wavelength of about 1.55 μm has a wavelength appropriate for suppressing scattering and absorption in the atmosphere and the lens. Based on such a review, the present inventor and the like have found that setting a region including 1.55 μm as an imaging wavelength region of the near-infrared light in the imaging apparatus capable of imaging using the visible light and the near-infrared light is most appropriate for improving the resolution of the captured image.

Accordingly, it is necessary to design such that a transmittance profile based on the wavelength of transmitted light of the imaging lens has a peak of transmittance in a region including 1550 nm. Furthermore, even in a visible light wavelength region, it is preferable to obtain the highest resolution possible. Thus, it is preferable that the visible light wavelength region has a region having the highest light transmittance possible. As a result of keen examination by the present inventor and the like, it is apparent that in order to design such that the transmittance profile based on the wavelength of the transmitted light of the imaging lens has a peak of transmittance in the region including 1550 nm, and that the visible light wavelength region also has the region having the highest light transmittance possible, it is effective to form a region having low light transmittance between the visible light wavelength region and a near-infrared light wavelength region including 1550 nm.

In addition, it has been found that light transmittance of the wavelength region including 1550 nm can be further improved by decreasing light transmittance of a specific wavelength in the visible light. This configuration is particularly advantageous in a case of prioritizing high-resolution imaging in the near-infrared light wavelength region including 1550 nm over imaging using the visible light.

Meanwhile, for example, the visible light wavelength region of 0.4 to 0.7 μm and the near-infrared light wavelength region of 1550 nm have a difference in wavelength such that the number of digits is different. As the difference in wavelength is increased, a difference in focal length between the visible light and the near-infrared light is also increased. Thus, in a case where imaging is performed using light of both of the visible light and the near-infrared light, light in a focused state and light in a non-focused state coexist. This causes a decrease in resolution of the captured image. Accordingly, in a case of imaging, it is preferable to be capable of switching between a configuration for imaging using only the visible light and a configuration for imaging using only the near-infrared light in the imaging apparatus.

Furthermore, a difference in focusing position between a visible light wavelength and a near-infrared light wavelength changes depending on a magnitude of a zoom magnification. Thus, in a case where imaging targeting the visible light and imaging targeting the near-infrared light are switched, it is difficult to re-adjust the focusing position. This is because changing of the zoom magnification and adjustment of the focusing position for light of a specific wavelength are performed in connection with each other in the technology of the related art. Thus, in order to adjust the focusing position between the visible light wavelength and the near-infrared light wavelength, it is preferable to use a dedicated focal point adjustment system and/or dispose an optical member changing an optical path length of at least one of the visible light and the near-infrared light. Hereinafter, the "zoom magnification" will be simply referred to as the "magnification".

Figure 1:
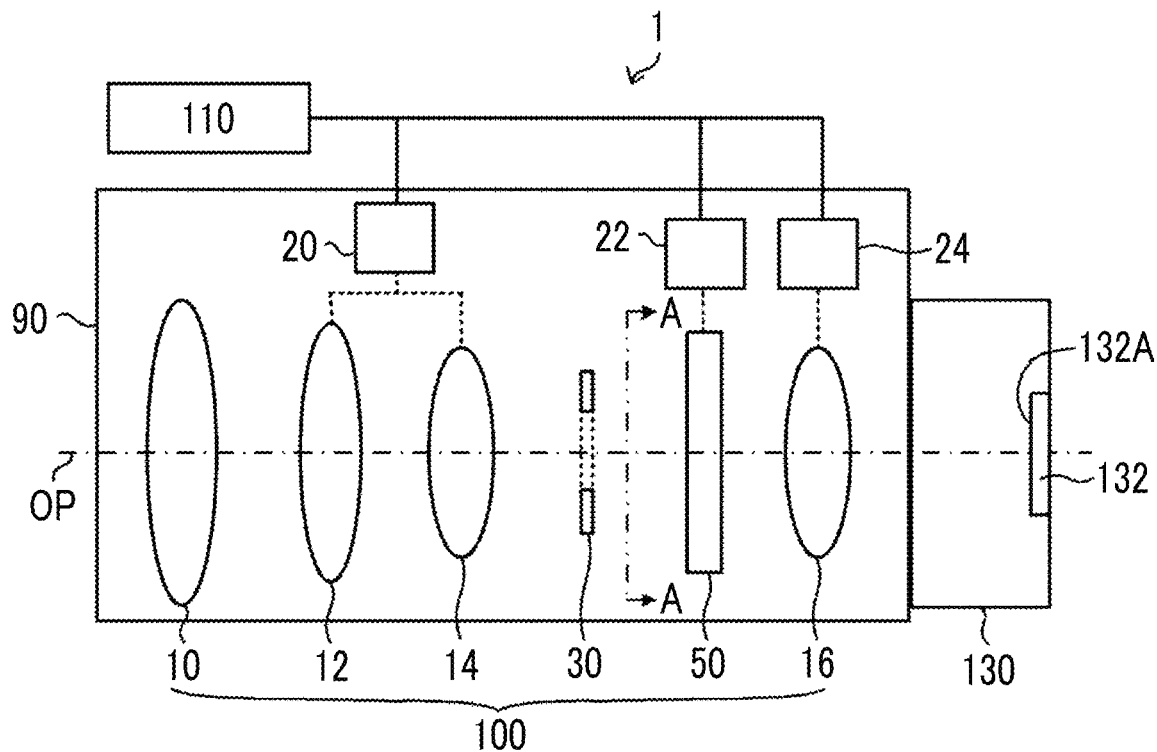
FIG. 1 is a schematic configuration diagram of an imaging apparatus including an imaging lens according to an embodiment.

Next, an imaging apparatus 1 using an imaging lens 100 according to the embodiment will be described with reference to the drawings. As illustrated in FIG. 1, the imaging apparatus 1 comprises the imaging lens 100 and an imaging unit 130. The imaging unit 130 comprises an imaging element 132. The imaging element 132 converts an optical image of an imaging target formed by the imaging lens 100 into an electric signal. For example, the imaging apparatus 1 is a monitoring camera capable of imaging up to a long range. Here, for example, the "long range" refers to a distance of a few kilometers to a few tens of kilometers.

The imaging lens 100 is a telephoto lens having a plurality of lenses. The imaging lens 100 comprises, from an objective side toward an image formation side, an objective lens 10, a focus lens 12, a zoom lens 14, a stop 30, an optical filter switching unit 50, and an adjustment lens 16. The objective side is a side on which the imaging target is present, and the image formation side is a side on which the optical image of the target is formed, that is, a side on which the imaging element 132 is present. In the present specification, for example, the "imaging lens" means an optical system for forming the optical image of the imaging target on an imaging surface 132A of the imaging element 132 by the plurality of lenses. The "imaging lens" may include not only the lenses but also an optical element such as a stop, an optical filter, a half mirror, and/or a polarization element.

The objective lens 10 is fixed to a casing 90 holding each optical element such as the lenses and condenses light from the imaging target.

The focus lens 12 is an optical system adjusting the focusing position of a target image. The zoom lens 14 is an optical system adjusting the zoom magnification. The focus lens 12 and the zoom lens 14 move forward and rearward along an optical axis OP of the imaging lens 100 in connection with each other by a cam mechanism (not illustrated). Accordingly, the magnification is changed, and the focusing position is adjusted such that the focusing position is brought to the imaging surface 132A of the imaging element 132. The optical axis OP will be referred to as the optical path OP. The focus lens 12 and the zoom lens 14 are driven by rotating a zoom cam (not illustrated) by a zoom lens driving mechanism 20. The zoom lens driving mechanism 20 is controlled by a control unit 110 in accordance with an instruction issued to the imaging apparatus 1 from a user. The zoom lens 14 is one example of a "zoom optical system" according to the embodiment of the technology of the present disclosure.

The stop 30 is an optical element that blocks unnecessary light such as stray light and narrows luminous flux. The optical filter switching unit 50 is an apparatus for switching to different optical filters between imaging using the visible light and imaging using the near-infrared light. In FIG. 1, the stop 30 is arranged between the zoom lens 14 and the optical filter switching unit 50, but a position of the stop 30 is not limited thereto. For example, the stop 30 may be arranged to be movable between the focus lens 12 and the zoom lens 14.

Figure 2:
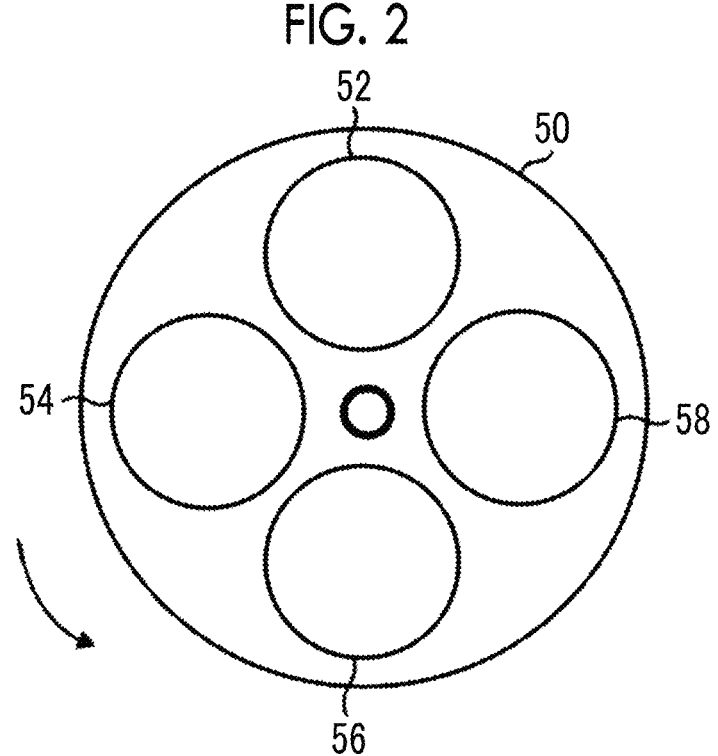
FIG. 2 is a schematic diagram of an optical filter switching unit seen from A-A direction of FIG. 1.

As illustrated in FIG. 2, the optical filter switching unit 50 is a switching apparatus of a turret type in which four optical filters 52, 54, 56, and 58 are arranged in a circular plate. This switching apparatus arranges each optical filter on the optical path OP by rotating the circular plate by a turret driving mechanism 22 such as a motor. The optical filter switching unit 50 comprises a sensor, not illustrated, for detecting the filter arranged on the optical path OP. An installation location of the sensor may be the turret driving mechanism 22 instead of the optical filter switching unit 50. The turret driving mechanism 22 is controlled by the control unit 110 in accordance with the instruction issued to the imaging apparatus 1 from the user.

In FIG. 1, the optical filter switching unit 50 is arranged between the zoom lens 14 and the adjustment lens 16, but a position of the optical filter switching unit 50 is not limited thereto. The optical filter switching unit 50 is arrangeable between the target object side of the objective lens 10 and the image formation side of the adjustment lens 16. For example, the optical filter switching unit 50 may be arranged between the adjustment lens 16 and the imaging element 132.

The imaging apparatus 1 may be configured such that the casing 90 accommodating the imaging lens 100 is separable from the imaging unit 130. For example, the imaging apparatus 1 may be configured such that the casing 90 is an interchangeable lens unit, the imaging unit 130 is a camera unit, and any of a plurality of types of lens units is attachable to one camera unit. In this case, the optical filter switching unit 50 may be arranged in the imaging unit 130, that is, the camera unit.

The optical filter 52 is a bandpass filter that decreases light transmittance in at least a part of the wavelength region of the near-infrared light. For example, the light transmittance in at least the part of the wavelength region of the near-infrared light refers to light transmittance related to a light transmission region in a near-infrared light region of the imaging lens 100. Here, for example, the near-infrared light region refers to a wavelength region of greater than or equal to 1100 nm in the near-infrared light wavelength region. In addition, for example, the light transmission region in the near-infrared light region refers to a near-infrared light peak wavelength region described later. The optical filter (bandpass filter) 52 is one example of a second optical filter according to the embodiment of the technology of the present disclosure. The optical filter 52 is arranged on the optical path OP in a case of imaging using the visible light by the imaging apparatus 1.

The optical filter 54 is a bandpass filter that decreases light transmittance in at least a part of the wavelength region of the visible light. At least the part of the wavelength region of the visible light refers to a light transmission region in a visible light region of the imaging lens 100. Here, for example, the visible light region refers to a wavelength region of less than or equal to 800 nm. In addition, for example, the light transmission region in the visible light region refers to a visible light peak wavelength region described later. The optical filter (bandpass filter) 54 is one example of a first optical filter according to the embodiment of the technology of the present disclosure. The optical filter 54 is arranged on the optical path OP in a case of imaging using the near-infrared light.

The optical filter 56 is a transparent glass plate having a refractive index close to the other optical filters 52, 54, and 58. In a case of not using the other optical filters 52, 54, and 58, the optical filter 56 is an optical path length adjustment filter for preventing the optical path length from changing from the optical path length in a case of using the optical filters 52, 54, and 58. The optical filter 58 is a neutral density (ND) filter for adjusting the amount of light.

An ND value that is a product of a refractive index and a thickness of the optical filter 52 is greater than an ND value that is a product of the refractive index and the thickness of the optical filter 54. This is for decreasing a difference between the focusing position for the visible light and the focusing position for the near-infrared light by decreasing a difference in optical path length in a case of switching between the visible light and the near-infrared light as light of the imaging target. That is, while the visible light is transmitted through the optical filter 52, the focal length for the visible light is shorter than the focal length for the near-infrared light. Therefore, the optical path length is increased by setting the ND value of the optical filter 52 to be greater than the ND value of the optical filter 54 through which the near-infrared light is transmitted. By this configuration, a deviation between the focusing position for the visible light and the focusing position for the near-infrared light can be decreased. A configuration for changing the ND value of the optical filter 52 and the ND value of the optical filter 54 is advantageous in a case where, as will be disclosed below, a deviation between the focusing position for the visible light and the focusing position for the near-infrared light cannot be adjusted by only the adjustment lens 16.

The adjustment lens 16 is a lens for adjusting a difference between the focal length for the visible light and the focal length for the near-infrared light in a case of switching between the optical filter 52 and the optical filter 54. The focal length for the near-infrared light having a longer wavelength than the visible light is longer than the focal length for the visible light. Since the focus lens 12 and the zoom lens 14 are configured to move in connection with each other to set the focusing position in a case of zooming for the visible light to the imaging surface 132A of the imaging element 132, the focusing position for the near-infrared light cannot be adjusted. Thus, in a case of imaging using the near-infrared light, that is, in a case where the optical filter 54 is arranged on the optical path OP, the adjustment lens 16 is moved to set the focusing position to the imaging surface 132A based on focusing position data described later. The adjustment lens 16 is one example of a "focusing position adjustment lens" according to the embodiment of the technology of the present disclosure.

The adjustment lens 16 is driven by an adjustment lens driving mechanism 24. The adjustment lens driving mechanism 24 is controlled by the control unit 110 in accordance with the instruction from the user. Specifically, the control unit 110 controls the adjustment lens driving mechanism 24 such that a position of the adjustment lens 16 is adjusted to the focusing position in accordance with an imaging condition provided as an instruction by the user. Here, for example, the imaging condition refers to selection of the visible light or the near-infrared light and selection of the zoom magnification based on the instruction of the user. The focusing position of the adjustment lens 16 refers to the position of the adjustment lens 16 for forming an image of light on the imaging surface 132A of the imaging element 132 in the focused state.

Alternatively, the control unit 110 may adjust the position of the adjustment lens 16 based on the focusing position data by identifying the optical filter arranged on the optical path OP based on filter position information from the sensor disposed in the optical filter switching unit 50. For example, in a case where the user provides an instruction to perform imaging using the visible light to the control unit 110 through an input unit 28 described later, the optical filter 52 is arranged on the optical path OP by the control unit 110. In a case where the user provides an instruction to perform imaging using the near-infrared light to the control unit 110 through the input unit 28, the optical filter 54 is arranged on the optical path OP by the control unit 110. The control unit 110 detects a type of optical filter on the optical path OP by the sensor disposed in the optical filter switching unit 50 and adjusts the position of the adjustment lens 16 based on the detected type of optical filter. The adjustment lens 16 can also be used for adjusting a flange back in a case of interchanging the imaging unit 130.

Figure 3:
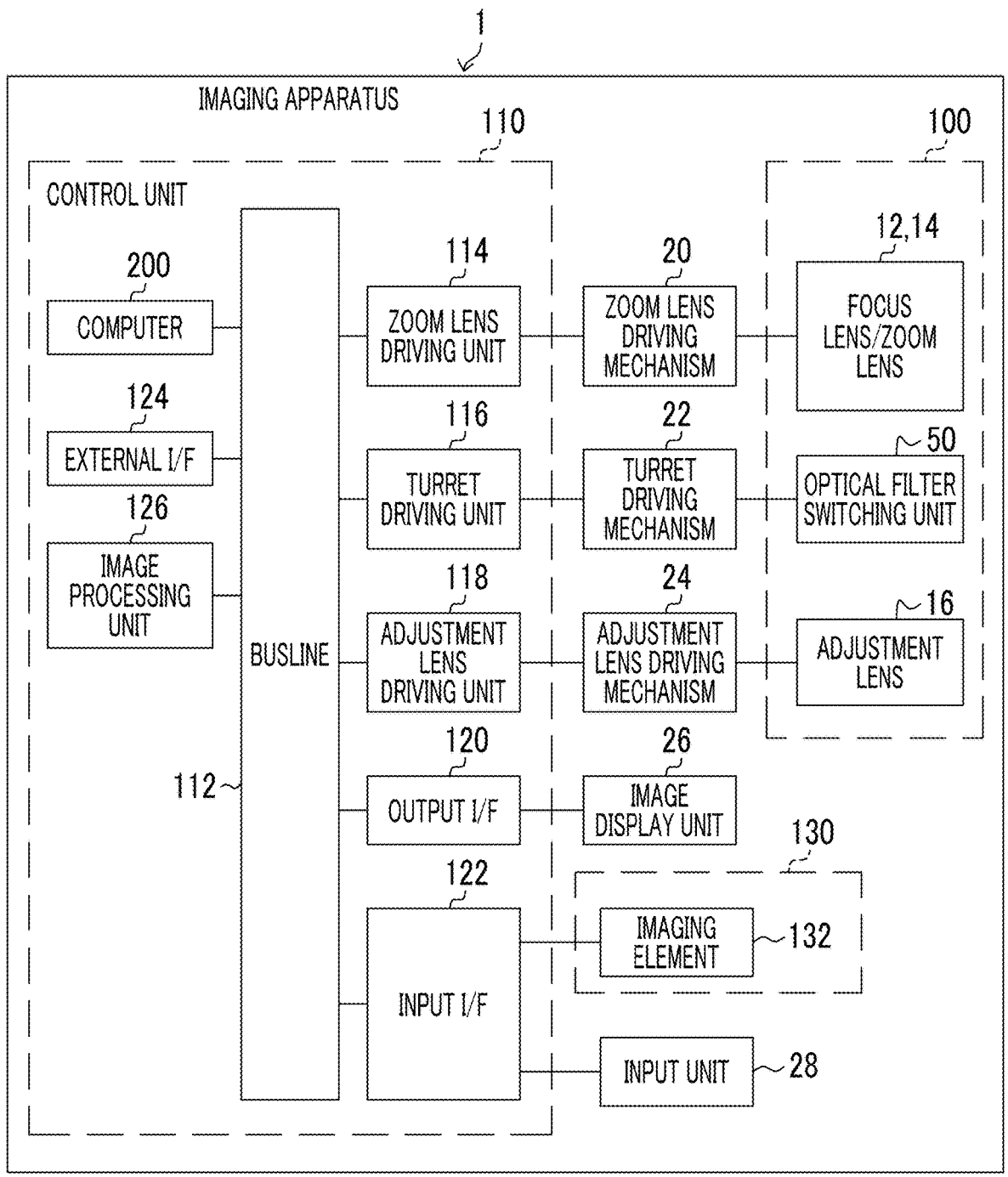
FIG. 3 is a schematic block configuration diagram of the imaging apparatus according to the embodiment.
Figure 4:
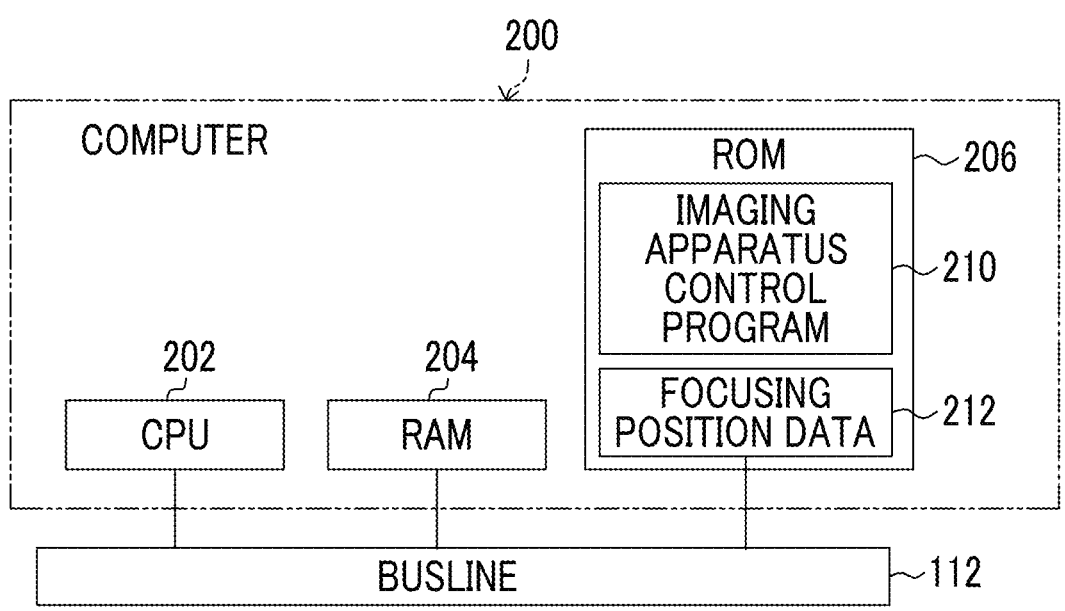
FIG. 4 is a schematic configuration diagram of a computer according to the embodiment.

As illustrated in FIG. 3 as one example, the imaging apparatus 1 is controlled by the control unit 110. The control unit 110 comprises a computer 200. As illustrated in FIG. 4 as one example, the computer 200 includes a CPU 202, a RAM 204, and a ROM 206 connected to each other through a busline 112. The CPU 202 controls the entire imaging apparatus 1. For example, the RAM 204 is a volatile memory used as a work area or the like in a case of executing an imaging apparatus control program. For example, the ROM 206 is a non-volatile memory storing an imaging apparatus control program 210 controlling the imaging apparatus 1, focusing position data 212, and the like. While the CPU 202 is illustrated in the present embodiment, it is also possible to use a plurality of CPUs instead of the CPU 202.

The CPU 202 reads out the imaging apparatus control program 210 from the ROM 206 and loads the read imaging apparatus control program 210 into the RAM 204. By executing the imaging apparatus control program 210, the CPU 202 controls a zoom lens driving unit 114, a turret driving unit 116, and an adjustment lens driving unit 118 illustrated in FIG. 3 as one example.

The focusing position data 212 is data in which the position of the adjustment lens 16 in a case of performing imaging using the visible light and the position of the adjustment lens 16 in a case of performing imaging using the near-infrared light are associated with the magnification. As described above, a case of performing imaging using the visible light is a case where the optical filter 52 is arranged by the optical filter switching unit 50. A case of performing imaging using the near-infrared light is a case where the optical filter 54 is arranged by the optical filter switching unit 50. For example, the focusing position data 212 is stored as position data of the adjustment lens 16 for each magnification for the visible light and the near-infrared light. The focusing position data 212 is one example of "focusing position information" according to the embodiment of the technology of the present disclosure.

Well-known mechanisms can be used for the zoom lens driving mechanism 20, the turret driving mechanism 22, and the adjustment lens driving mechanism 24. While a case where these mechanisms are present inside the casing 90 is illustrated in FIG. 1, these mechanisms may be arranged outside the casing 90.

For example, the imaging element 132 is an InGaAs imaging element capable of imaging a subject in the wavelengths of light of both of the visible light and the near-infrared light. The optical image formed by the imaging lens 100 is converted into an electric signal by the imaging element 132 of the imaging unit 130, subjected to various types of image processing, and then, displayed as an image on an image display unit 26 described later. The image subjected to the image processing may be transmitted to an outside in a wired or wireless manner.

As illustrated in FIG. 3, the control unit 110 includes the zoom lens driving unit 114, the turret driving unit 116, the adjustment lens driving unit 118, an output I/F 120, an input I/F 122, an image processing unit 126, and the computer 200. These are connected through the busline 112. In addition, the control unit 110 includes an external I/F not illustrated.

The zoom lens driving unit 114 is connected to the zoom lens driving mechanism 20. The turret driving unit 116 is connected to the turret driving mechanism 22. The adjustment lens driving unit 118 is connected to the adjustment lens driving mechanism 24. The output I/F 120 is connected to the image display unit 26. The input I/F 122 is connected to the imaging element 132 and the input unit 28.

The image display unit 26 displays an image based on an image signal input through the output I/F 120. The input unit 28 receives the instruction issued from the user. The input I/F 122 is an interface for receiving the electric signal from the imaging element 132 and the instruction input from the user through the input unit and transmitting the electric signal and the instruction to the computer 200. For example, the external I/F is an interface for receiving an instruction from the user by wireless communication and transmitting the image subjected to the image processing by wireless communication. The image processing unit 126 performs the image processing on the image acquired by the imaging element 132.

The zoom lens driving unit 114 adjusts a position of the focus lens 12 and a position of the zoom lens 14 by controlling the zoom lens driving mechanism 20 in accordance with an instruction of the computer 200. The turret driving unit 116 switches the filters of the optical filter switching unit 50 by controlling the turret driving mechanism 22 in accordance with an instruction of the control unit 110. The adjustment lens driving unit 118 adjusts the position of the adjustment lens 16 by controlling the adjustment lens driving mechanism 24 in accordance with the instruction of the control unit 110. The output I/F 120 is an interface for transmitting, to the image display unit 26, the captured image obtained by performing the image processing by the image processing unit 126.

Figure 5:
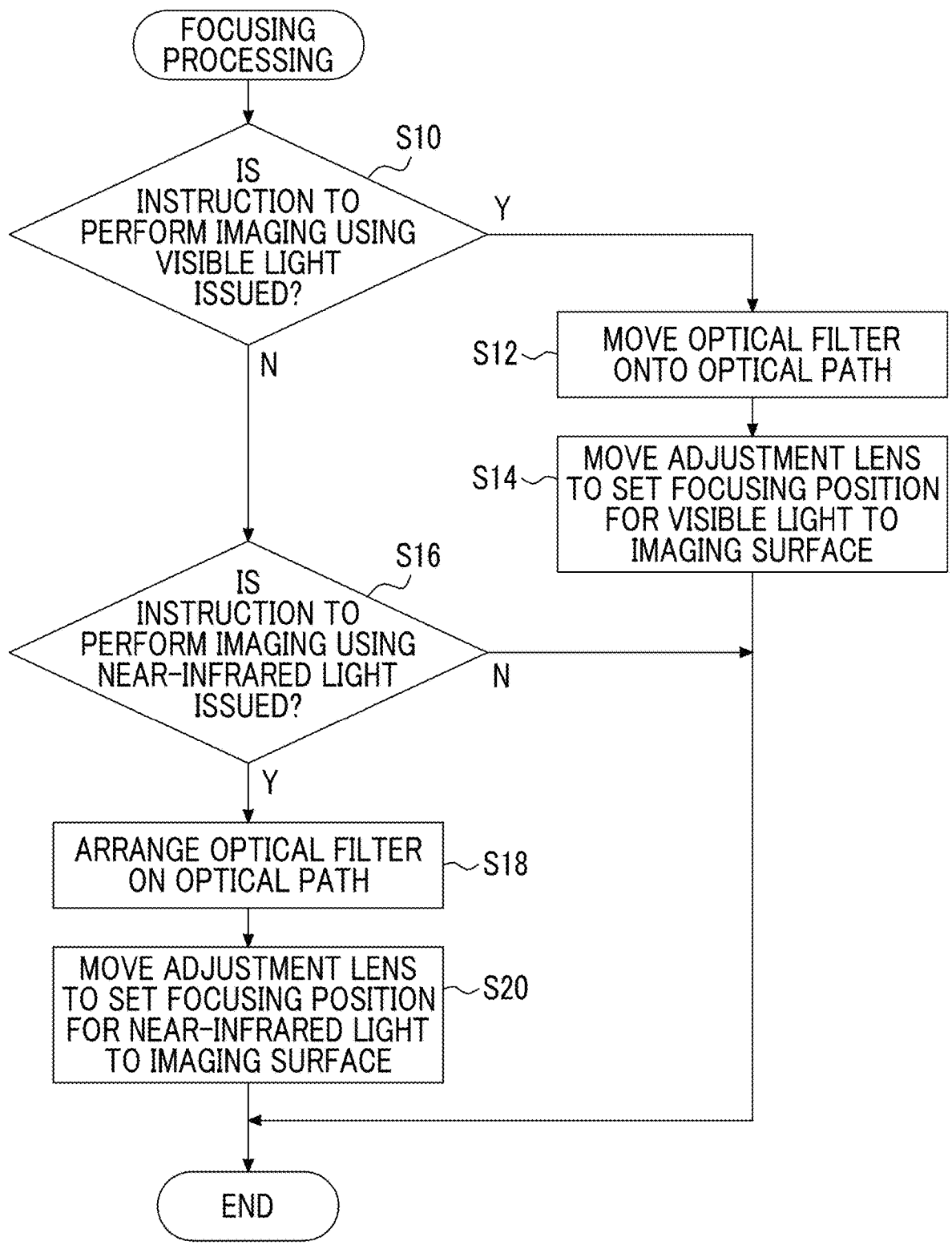
FIG. 5 is a flowchart of focusing processing according to the embodiment.

Next, focusing processing that is one example of a driving control performed on the optical filter switching unit 50 and the adjustment lens 16 by the CPU 202 will be described with reference to FIG. 5. FIG. 5 is a flowchart illustrating one example of a flow of focusing processing executed by the CPU 202 in accordance with the imaging apparatus control program 210. The focusing processing illustrated in FIG. 5 is processing that assumes that the imaging condition for the visible light or the near-infrared light as the instruction is provided by the user through the input unit 28, and that the optical filter switching unit 50 and the adjustment lens 16 are driven based on the imaging condition provided as the instruction.

First, in step S10, the CPU 202 determines whether or not the instruction to perform imaging using the visible light is provided by the user. In step S10, in a case where the instruction to perform imaging using the visible light is provided by the user, a positive determination is made, and the focusing processing transitions to step S12. In step S10, in a case where the instruction to perform imaging using the visible light is not provided by the user, a negative determination is made, and the focusing processing transitions to step S16.

In step S12, the CPU 202 arranges the optical filter 52 on the optical path OP by controlling the turret driving unit 116.

In subsequent step S14, the CPU 202 moves the adjustment lens 16 to set the focusing position for the visible light to the imaging surface 132A of the imaging element 132 by controlling the adjustment lens driving unit 118, and finishes the processing.

In step S16, the CPU 202 determines whether or not the instruction to perform imaging using the near-infrared light is provided by the user. In step S16, in a case where the instruction to perform imaging using the near-infrared light is provided by the user, a positive determination is made, and the focusing processing transitions to step S18. In step S16, in a case where the instruction to perform imaging using the near-infrared light is not provided by the user, a negative determination is made, and the focusing processing is finished.

In step S18, the CPU 202 arranges the optical filter 54 on the optical path OP by controlling the turret driving unit 116.

In subsequent step S20, the CPU 202 moves the adjustment lens 16 to set the focusing position for the near-infrared light to the imaging surface 132A of the imaging element 132 and then, finishes the focusing processing.

As described above, the control unit 110 has the focusing position information indicating the focusing position in a case of arranging the optical filter 54, which is one example of the first optical filter, or the optical filter 52, which is one example of the second optical filter, on the optical path and performs a control for changing the position of the focusing position adjustment lens between a case where the optical filter 54 which is one example of the first optical filter is arranged on the optical path, and a case where the optical filter 52 which is one example of the second optical filter is arranged on the optical path, based on the focusing position information. Accordingly, it is possible to easily adjust a focal point in near-infrared light imaging.

The focusing processing is merely one example. Accordingly, unnecessary steps may be deleted, new steps may be added, or a processing order may be rearranged without departing from a gist of the present disclosure.

While an example of storing the imaging apparatus control program 210 and the focusing position data 212 in the ROM 206 of the control unit 110 is described in the present embodiment, the technology of the present disclosure is not limited thereto. For example, at least one of the imaging apparatus control program 210 or the focusing position data 212 may be stored in an HDD, an EEPROM, a flash memory, or the like connected to the busline 112.

Figure 13:
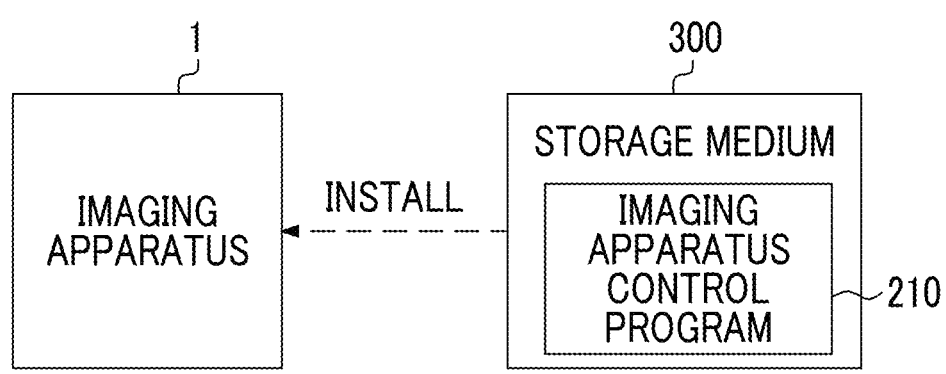
FIG. 13 is a conceptual diagram illustrating an aspect in which a program is installed on the imaging apparatus from a storage medium.

The imaging apparatus control program 210 may be stored in any portable storage medium 300 such as an SSD, a USB memory, or a DVD-ROM as illustrated in FIG. 13. In this case, the imaging apparatus control program 210 stored in the storage medium 300 is installed on the computer 200 of the control unit 110, and the installed imaging apparatus control program 210 is executed by the CPU 202 of the control unit 110.

The imaging apparatus control program 210 may be stored in a storage unit of another computer, a server apparatus, or the like connected to the control unit 110 of the imaging apparatus 1 through a communication network (not illustrated), and the imaging apparatus control program 210 may be downloaded in response to a request of the imaging apparatus 1. In this case, the downloaded imaging apparatus control program 210 is executed by the CPU 202 of the control unit 110.

The control unit 110 may be arranged in the casing 90 of the imaging lens 100. Alternatively, the control unit 110 may be arranged in the imaging unit 130 instead of the casing 90 of the imaging lens 100. In a case where a plurality of types of imaging lenses 100 are present, by arranging the control unit 110 storing all control programs for each imaging lens in the imaging unit 130, the interchanged imaging lens 100 can be controlled by the control unit 110 even in a case where the imaging lenses 100 of different types are interchanged together with the casing 90.

Next, light transmittance of the imaging lens 100 will be described. Each lens of the imaging lens 100 is provided with a coating in order to have high light transmittance for a specific wavelength region of the visible light and the near-infrared light. The coating is preferably configured with a plurality of layers as a coating formed by laminating a lens surface with thin film shapes of materials such as $TiO_2$, $Ta_2O_5$, $Al_2O_3$, $SiO_2$, and $MgF_2$ through which light is transmitted. By adjusting a refractive index, a thickness, and the number of layers of the material forming a thin film, light transmittance in a specific wavelength region can be increased, and the light transmittance in the specific wavelength region can be decreased. A coating material, a coating thickness, and the number of coating layers for increasing the light transmittance in the specific wavelength region and decreasing the light transmittance in the specific wavelength region can be designed by computer simulation or the like.

For example, the light transmittance means a ratio of an intensity of light exiting from the lens to an intensity of light incident on the lens in a case where light of a certain wavelength is incident on the lens, and is represented by the following expression.

Light transmittance (%)=100×(intensity of exiting ray)/(intensity of incidence ray)

While illustration is simplified in FIG. 1, each of the objective lens 10, the focus lens 12, the zoom lens 14, and the adjustment lens 16 is composed of a lens group of one or more lenses. The entire imaging lens 100 is composed of a few lenses to a few tens of lenses. Each lens of the imaging lens 100 is provided with the coating in order to have high light transmittance for the specific wavelength region of the visible light and the near-infrared light. The coating may be provided to only a part of all of the lenses. However, the coating is more preferably provided to all of the lenses.

As described above, in a case where the user images a scene or the like using the near-infrared light, the imaging lens preferably has highest light transmittance possible near 1550 nm because scattering and absorption of the near-infrared light in the atmosphere and the lens are smallest near 1550 nm. In order to further enable imaging using the visible light, the imaging lens preferably has high light transmittance in the widest region of the visible light possible.

In order to satisfy the above two conditions, a peak of light transmittance in the near-infrared light wavelength region is preferably included in the near-infrared light peak wavelength region including 1550 nm in the near-infrared light wavelength region. That is, it is preferable that light transmittance on a short wavelength side of the near-infrared light peak wavelength region including 1550 nm is reduced from light transmittance at a short wavelength end of the near-infrared light peak wavelength region as the wavelength is decreased, and that light transmittance on a long wavelength side of the near-infrared light peak wavelength region is reduced from light transmittance at a long wavelength end of the near-infrared light peak wavelength region as the wavelength is increased.

In addition, the visible light peak wavelength region including a range of 500 nm to 650 nm is preferably included in the visible light wavelength region. That is, it is preferable that light transmittance on a short wavelength side of the visible light peak wavelength region including the range of 500 nm to 650 nm is reduced from light transmittance at a short wavelength end of the visible light peak wavelength region as the wavelength is decreased, and that light transmittance on a long wavelength side of the visible light peak wavelength region is reduced from light transmittance at a long wavelength end of the visible light peak wavelength region as the wavelength is increased.

The inventor and the like have found that an imaging lens that has high resolution for both of the near-infrared light and the visible light and particularly has significantly high resolution for the near-infrared light can be manufactured by providing a coating that forms a light transmittance peak having the above feature.

The "near-infrared light peak wavelength region" refers to a wavelength region in which the peak of the light transmittance in the near-infrared light wavelength region is allowed to be present in design in order to set the highest light transmittance possible near 1550 nm. As will be described later, a plurality of peaks having the same or different heights may be present in the near-infrared light peak wavelength region. For example, the near-infrared light peak wavelength region is a region of a wavelength of 1450 nm to 1650 nm. Preferably, the near-infrared light peak wavelength region is a region of a wavelength of 1480 nm to 1620 nm. More preferably, the near-infrared light peak wavelength region is a region of a wavelength of 1500 nm to 1580 nm. In a case where the imaging lens 100 is particularly composed of a long focal point zoom lens enabling observation up to a long range, an observation distance is decreased as the light transmittance in the near-infrared light peak wavelength region is decreased. Thus, the light transmittance in the near-infrared light peak wavelength region is important. For example, in a case where the light transmittance near a wavelength of 1550 nm is approximately 90%, it is possible to observe up to 30 km or more ahead. In a case where the light transmittance near a wavelength of 1550 nm is greater than or equal to 60%, it can be expected that an observation distance of approximately 20 km is secured.

The light transmittance in the near-infrared light peak wavelength region is preferably greater than or equal to 60%, more preferably greater than or equal to 70%, and further preferably greater than or equal to 80%. In addition, a peak value of the light transmittance in the near-infrared light peak wavelength region is preferably greater than or equal to 80%, more preferably greater than or equal to 85%, and further preferably greater than or equal to 90%. Particularly, the light transmittance in a wavelength of 1550 nm is preferably greater than or equal to 80%, more preferably greater than or equal to 85%, still more preferably greater than or equal to 88%, and further preferably greater than or equal to 90%.

The "visible light peak wavelength region" refers to a wavelength region in which the peak of the light transmittance in the visible light wavelength region is allowed to be present in design in order to set the highest light transmittance possible near 1550 nm and secure a region having high light transmittance in the visible light wavelength region. As will be described later, a plurality of peaks having the same or different heights may be present in the visible light peak wavelength region. For example, the visible light peak wavelength region is a region of a wavelength of 450 nm to 700 nm. Preferably, the visible light peak wavelength region is a region of a wavelength of 480 nm to 680 nm. More preferably, the visible light peak wavelength region is a region of a wavelength of 500 nm to 650 nm.

The light transmittance in the visible light peak wavelength region is preferably greater than or equal to 50%, more preferably greater than or equal to 60%, and further preferably greater than or equal to 70%. A peak value of the light transmittance in the visible light peak wavelength region is preferably greater than or equal to 85%, more preferably greater than or equal to 90%, and further preferably greater than or equal to 93%.

The above light transmittance is light transmittance of all of the plurality of lenses of the imaging lens 100. The light transmittance of the entire imaging lens 100 is a value of integrating accumulation of light transmittance of each lens. For example, in a case where the light transmittance of all individual lenses is the same and denoted by x, and the number of lenses is denoted by n, light transmittance X of the entire imaging lens 100 is provided as $X=x^n$. While light transmittance per lens also depends on the number of lenses, the light transmittance per lens is preferably greater than or equal to 95%, more preferably greater than or equal to 98%, and further preferably greater than or equal to 99%.

For example, in a case of the imaging apparatus 1 for long range imaging, setting of the light transmittance of the entire imaging lens 100 is decided by considering resolution of a target image and a distance to the target imaged by the imaging apparatus 1 using the near-infrared light. For example, the resolution can be defined as the maximum distance in which the target can be visually recognized in the image obtained by imaging the target having a predetermined size at a position separated by a certain distance by the imaging apparatus 1. Light transmittance for obtaining the resolution determined in such a manner is decided by actual measurement or simulation or the like, and the light transmittance per lens is decided from the total number of lenses. A light transmittance profile of one lens is decided using the above method, and a coating with which the light transmittance profile is obtained is provided. Setting of the light transmittance may be decided by different evaluation of the resolution. In addition, the light transmittance may be decided from a different viewpoint instead of the resolution.

EXAMPLES

Example 1

Figure 6:
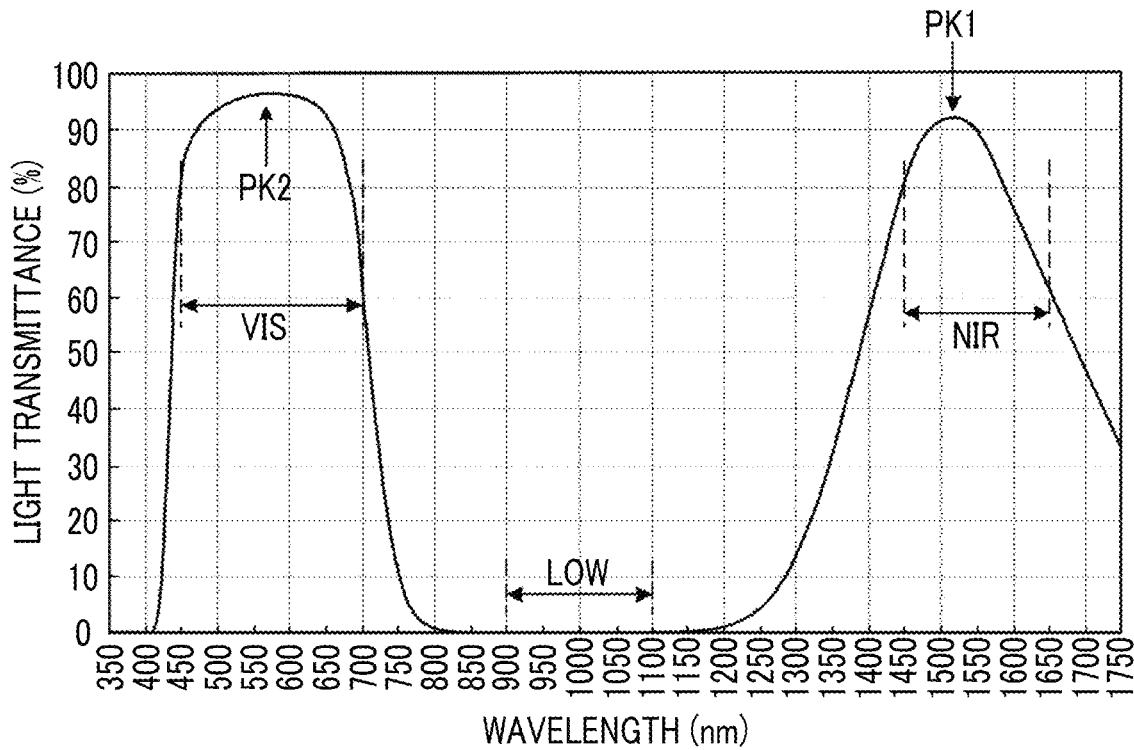
FIG. 6 is a light transmittance profile of an imaging lens of Example 1.

FIG. 6 illustrates a light transmittance profile of the imaging lens 100 according to Example 1. In FIG. 6, a horizontal axis is the wavelength, and a vertical axis is the light transmittance of the imaging lens 100. As illustrated in FIG. 6, the light transmittance profile of the imaging lens 100 has a first transmittance peak PK1 in a near-infrared light peak wavelength region NIR of 1450 nm to 1650 nm. That is, as the wavelength is decreased, light transmittance on a short wavelength side of the near-infrared light peak wavelength region NIR is reduced from light transmittance at a short wavelength end (1450 nm) of the near-infrared light peak wavelength region NIR. In addition, as the wavelength is increased, light transmittance on a long wavelength side of the near-infrared light peak wavelength region NIR is reduced from light transmittance at a long wavelength end (1650 nm) of the near-infrared light peak wavelength region NIR.

As is perceived from FIG. 6, light transmittance at the first transmittance peak PK1 is approximately 92% in a wavelength of 1520 nm. In addition, light transmittance in a range of a wavelength of 1490 nm to 1560 nm is greater than or equal to 90%.

In addition, the light transmittance profile of the imaging lens 100 has a second transmittance peak PK2 in a visible light peak wavelength region VIS of 450 nm to 700 nm. That is, as the wavelength is decreased, light transmittance on a short wavelength side of the visible light peak wavelength region VIS is reduced from light transmittance at a short wavelength end (450 nm) of the visible light peak wavelength region VIS. In addition, as the wavelength is increased, light transmittance on a long wavelength side of the visible light peak wavelength region VIS is reduced from light transmittance at a long wavelength end (700 nm) of the visible light peak wavelength region VIS.

As is perceived from FIG. 6, light transmittance at the second transmittance peak PK2 is approximately 96% in a wavelength of 570 nm to 580 nm. In addition, light transmittance in a range of a wavelength of 480 nm to 660 nm is greater than or equal to 90%.

In addition, light transmittance in a wavelength region on a short wavelength side in a blue wavelength region included in the visible light wavelength region is lower than light transmittance in a wavelength region on a long wavelength side in the blue wavelength region. Specifically, light transmittance in a wavelength region of less than or equal to 450 nm of the blue wavelength region is less than light transmittance in a wavelength region of greater than 450 nm. In addition, light transmittance in a wavelength of 400 nm to 430 nm is less than or equal to 50%. In a case where the light transmittance in the wavelength of 400 nm to 430 nm is increased above 50%, light transmittance in a wavelength of 1200 nm to 1290 nm that is a third harmonic and is a peak of a near-infrared wavelength band is also increased. This means that the peak of the near-infrared wavelength region is widened, and there is a possibility that light transmittance near a wavelength of 1550 nm is decreased, or that deterioration of characteristics such as remaining of ripples occurs.

Furthermore, the imaging lens 100 has a low light transmittance region LOW of lower light transmittance than the near-infrared light peak wavelength region and the visible light peak wavelength region across a wavelength of 900 nm to 1100 nm between the near-infrared light peak wavelength region and the visible light peak wavelength region. The light transmittance in the low light transmittance region LOW is preferably less than or equal to 5%. The low light transmittance region LOW is a region that occurs along with formation of a light transmittance peak for the near-infrared light region in the near-infrared light peak wavelength region NIR and formation of a light transmittance peak for the visible light region in the visible light peak wavelength region VIS. However, a wavelength of the low light transmittance region LOW is a wavelength region that does not contribute to any of imaging using the visible light and imaging using the near-infrared light. Thus, low light transmittance in the low light transmittance region LOW does not cause a problem.

The light transmittance profile illustrated in FIG. 6 has one light transmittance peak PK1 in the near-infrared light peak wavelength region NIR and one light transmittance peak PK2 in the visible light peak wavelength region VIS. However, a light transmittance profile according to the embodiment of the present disclosure is not limited thereto. The near-infrared light peak wavelength region NIR may have a shape (ripples) of a waveform formed by a plurality of light transmittance peaks. In addition, the visible light peak wavelength region VIS may have ripples. The ripples are a shape showing one characteristic of changes in light transmittance. In such a manner, the profile may have a light transmittance peak in the near-infrared light peak wavelength region NIR and have a light transmittance peak in the visible light peak wavelength region VIS, and presence or absence of the ripples, that is, the number of light transmittance peaks, is not limited.

A half-width of the first transmittance peak PK1 formed in the near-infrared light peak wavelength region NIR is preferably as narrow as possible. Near-infrared light that has a longer wavelength than the visible light is likely to show chromatic aberration compared to the visible light in a case where a wavelength range is widened. Accordingly, the wavelength range to be imaged is preferably as narrow as possible.

The light transmittance profile illustrated in FIG. 6 is obtained by providing a coating such that a light transmittance peak of a ⅓ wavelength of a fundamental wave that is generated from the fundamental wave having a light transmittance peak in the near-infrared light peak wavelength region due to interference caused by the coating is present in the visible light peak wavelength region. The fundamental wave preferably has a peak near 1550 nm. By configuring the coating such that a light transmission peak of a ½ wavelength of the fundamental wave is not shown, and that the light transmission peak of the ⅓ wavelength is increased, a light transmittance profile satisfying the above condition is obtained. Designing and forming the coating with which the light transmittance profile satisfying the above condition is obtained can be performed using the technology of the related art.

Figure 8:
FIG. 8 is an image obtained by imaging using the imaging lens of Example 1.

FIG. 8 illustrates an image of only the near-infrared light captured by the imaging lens 100 of Example 1 using the optical filter 54 having low transmittance of the visible light. An airplane that flies at a position estimated to be separated by 60 km and is not imaged using the visible light can be visually recognized.

Figure 9:
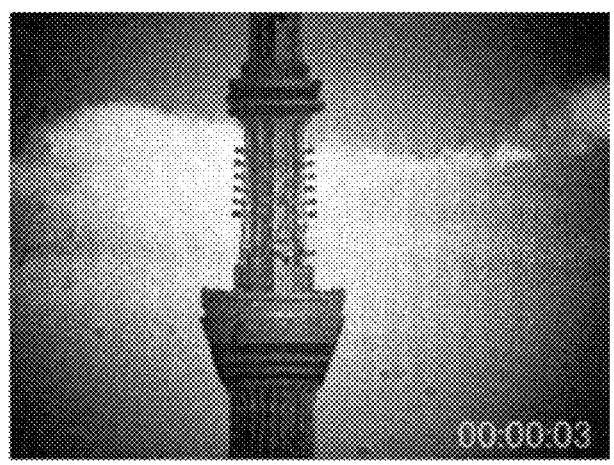
FIG. 9 is an image obtained by imaging targeting only near-infrared light using the imaging lens of Example 1.
Figure 10:
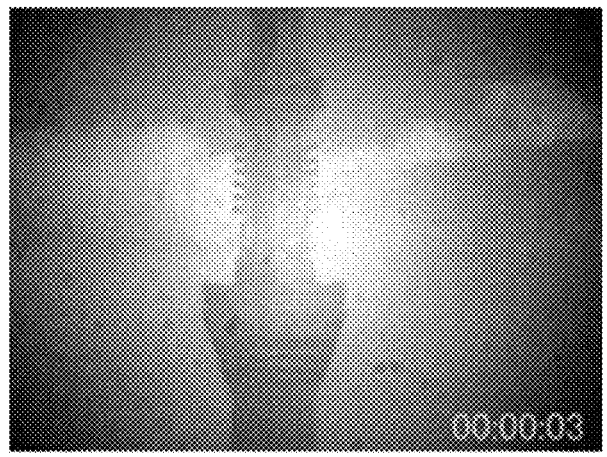
FIG. 10 is an image obtained by imaging targeting visible light and the near-infrared light.

FIG. 9 illustrates an enlarged image of Tokyo Skytree (registered trademark) captured by the imaging lens 100 of Example 1 using only the near-infrared light. Meanwhile, FIG. 10 illustrates an image captured without using the optical filter 54 having low transmittance of the visible light, that is, captured in the wavelengths of both of the visible light and the near-infrared light. In FIG. 10, imaging is performed using the wavelengths of both of the visible light and the near-infrared light of different focal lengths. Thus, the image is slightly blurred compared to FIG. 9. Accordingly, it is preferable to perform imaging using only the near-infrared light or only the visible light. Any of FIG. 8 to FIG. 10 is an image obtained by imaging Tokyo Skytree (registered trademark) by the imaging lens 100 of Example 1 from a location at a straight line distance of approximately 30 km.

Example 2

Figure 7:
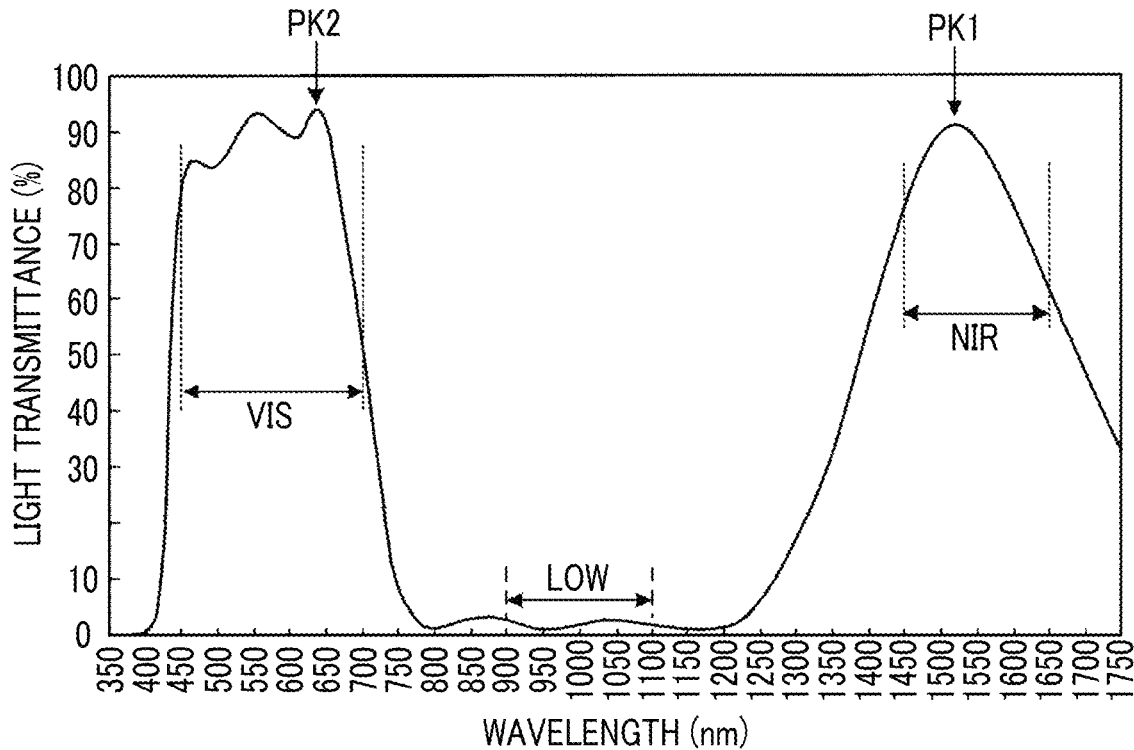
FIG. 7 is a light transmittance profile of an imaging lens of Example 2.

FIG. 7 illustrates a light transmittance profile of the imaging lens 100 according to Example 2. In the light transmittance profile illustrated in FIG. 7, ripples appear in the visible light peak wavelength region VIS. Meanwhile, ripples do not appear in the near-infrared light peak wavelength region NIR. For example, the ripples are likely to occur in a case where the number of layers of the coating is relatively small. That is, the number or the size of ripples can be decreased by increasing the number of layers of the coating. The number of ripples is the number of peaks. The size of ripples is, for example, the greatest height among heights from lowest positions between adjacent peaks.

The ripples illustrated in FIG. 7 may be present in the near-infrared light peak wavelength region NIR and/or the visible light peak wavelength region VIS. However, a first variable of at least one of the size or the number of ripples showing a characteristic of changes in light transmittance in the near-infrared light peak wavelength region NIR may be less than a corresponding second variable of the corresponding size or the number of ripples showing a characteristic of changes in light transmittance in the visible light peak wavelength region VIS. Furthermore, it is preferable to configure the coating such that the ripples are reduced in the near-infrared light peak wavelength region NIR. By having a single light transmittance peak without ripples in the near-infrared light peak wavelength region NIR, the peak value of the light transmittance in the near-infrared light peak wavelength region NIR can be increased. Accordingly, the resolution of the image captured using the near-infrared light can be increased. In a case where the first variable of the near-infrared light peak wavelength region NIR to be compared is the size of ripples, the "corresponding second variable of the size and the number of ripples in the visible light peak wavelength region" is the size of ripples. In a case where the first variable of the near-infrared light peak wavelength region NIR to be compared is the number of ripples, the "corresponding second variable of the size and the number of ripples in the visible light peak wavelength region" is the number of ripples.

In the embodiment, for example, various processors or circuits illustrated below can be used as a hardware structure of the control unit 110. The various processors or circuits include, in addition to the CPU that is a general-purpose processor functioning as each control unit by executing software (program) as described above, a PLD such as an FPGA having a circuit configuration changeable after manufacturing, a dedicated electric circuit such as an ASIC having a circuit configuration dedicatedly designed to execute a specific type of processing, or a combination or the like of the PLD, the ASIC, or the like and the CPU.

The control unit 110 may be configured with one of the various processors or circuits or may be configured with a combination of two or more processors or circuits of the same type or different types (for example, a combination of a plurality of FPGAs or a combination of the CPU and the FPGA). In addition, a plurality of control units may be configured with one processor.

As an example of configuring the plurality of control units with one processor, first, as represented by a computer such as a client and a server, a form in which one processor is configured with a combination of one or more CPUs and software and this processor functions as the plurality of control units is available. Second, as represented by a system on chip (SOC) or the like, a form of using a processor that implements, by one IC chip, a function of the entire system including the plurality of control units is available. Accordingly, the control unit 110 can be configured using one or more of the various processors as the hardware structure.

Furthermore, as the hardware structure of those various processors or circuits, more specifically, an electric circuit in which circuit elements such as semiconductor elements are combined can be used.

In the present specification, "A and/or B" has the same meaning as "at least one of A or B". This means that "A and/or B" may be only A, only B, or a combination of A and B. In addition, in the present specification, the same approach as "A and/or B" is applied to a case where three or more matters are represented by connecting the matters with "and/or".

All documents, patent applications, and technical standards disclosed in the present specification are incorporated in the present specification by reference to the same extent as in a case where each of the documents, patent applications, technical standards is specifically and individually indicated to be incorporated by reference.

EXPLANATION OF REFERENCES

1: imaging apparatus
10: objective lens
12: focus lens
14: zoom lens
16: adjustment lens
20: zoom lens driving mechanism
22: turret driving mechanism
24: adjustment lens driving mechanism
26: image display unit
28: input unit
30: stop
50: optical filter switching unit
52, 54, 56, 58: optical filter
90: casing
100: imaging lens
110: control unit
112: busline
114: zoom lens driving unit
116: turret driving unit
118: adjustment lens driving unit
120: output I/F
122: input I/F
126: image processing unit
130: imaging unit
132: imaging element
132A: imaging surface
200: computer
202: CPU
204: RAM
206: ROM
210: imaging apparatus control program
212: focusing position data

What is claimed is:

1. An imaging lens comprising:
   a plurality of lenses; and
   a coating provided on at least a part of the plurality of lenses,
   wherein in a near-infrared light wavelength region, by the coating, light transmittance on a short wavelength side of a near-infrared light peak wavelength region including 1550 nm is reduced from light transmittance at a short wavelength end of the near-infrared light peak wavelength region as a wavelength is decreased, and light transmittance on a long wavelength side of the near-infrared light peak wavelength region is reduced from light transmittance at a long wavelength end of the near-infrared light peak wavelength region as the wavelength is increased,
   light transmittance in the near-infrared light peak wavelength region is greater than or equal to 60%, and
   in a visible light wavelength region, by the coating, light transmittance on a short wavelength side of a visible light peak wavelength region including a range of 500 nm to 650 nm is reduced from light transmittance at a short wavelength end of the visible light peak wavelength region as the wavelength is decreased, and light transmittance on a long wavelength side of the visible light peak wavelength region is reduced from light transmittance at a long wavelength end of the visible light peak wavelength region as the wavelength is increased.

2. The imaging lens according to claim 1,
   wherein a first variable of at least one of a size or the number of ripples showing a characteristic of changes in light transmittance in the near-infrared light peak wavelength region is less than a corresponding second variable of a size or the number of ripples showing a characteristic of changes in light transmittance in the visible light peak wavelength region.

3. The imaging lens according to claim 1,
   wherein light transmittance in a wavelength region on a short wavelength side in a blue wavelength region included in the visible light wavelength region is lower than light transmittance in a wavelength region on a long wavelength side in the blue wavelength region.

4. The imaging lens according to claim 3,
   wherein the wavelength region on the short wavelength side in the blue wavelength region is a wavelength region of less than or equal to 450 nm.

5. The imaging lens according to claim 3,
wherein light transmittance in 400 nm to 430 nm is less than or equal to 50%.

6. The imaging lens according to claim 1,
wherein by the coating, a low light transmittance region of lower light transmittance than the near-infrared light peak wavelength region and the visible light peak wavelength region is included between the near-infrared light peak wavelength region and the visible light peak wavelength region.

7. The imaging lens according to claim 6,
wherein the low light transmittance region is a wavelength region of 900 nm to 1100 nm, and light transmittance in the wavelength region of 900 nm to 1100 nm is less than or equal to 5%.

8. The imaging lens according to claim 1,
wherein a light transmittance peak of a ⅓ wavelength of a fundamental wave that is generated from the fundamental wave having a light transmittance peak in the near-infrared light peak wavelength region due to interference caused by the coating is present in the visible light peak wavelength region.

9. An imaging lens comprising:
a plurality of lenses;
a coating provided on at least a part of the plurality of lenses, and
an optical filter switching unit capable of arranging at least one of a first optical filter decreasing light transmittance of at least a part of visible light or a second optical filter decreasing light transmittance of at least a part of near-infrared light, on an optical path,
wherein in a near-infrared light wavelength region, by the coating, light transmittance on a short wavelength side of a near-infrared light peak wavelength region including 1550 nm is reduced from light transmittance at a short wavelength end of the near-infrared light peak wavelength region as a wavelength is decreased, and light transmittance on a long wavelength side of the near-infrared light peak wavelength region is reduced from light transmittance at a long wavelength end of the near-infrared light peak wavelength region as the wavelength is increased,
wherein light transmittance in the near-infrared light peak wavelength region is greater than or equal to 60%.

10. The imaging lens according to claim 9,
wherein a product of a refractive index and a thickness of the second optical filter is greater than a product of a refractive index and a thickness of the first optical filter.

11. The imaging lens according to claim 9,
wherein the optical filter switching unit arranged on an image formation side of a lens that is positioned closest to the image formation side among the plurality of lenses is included.

12. The imaging lens according to claim 9, further comprising:
a control unit that has focusing position information indicating a focusing position in a case of arranging the first optical filter or the second optical filter on the optical path, and performs a control for changing a position of a focusing position adjustment lens between a case of arranging the first optical filter on the optical path and a case of arranging the second optical filter on the optical path, based on the focusing position information.

13. The imaging lens according to claim 1, further comprising:
a zoom optical system.

14. An imaging apparatus comprising:
the imaging lens according to claim 9; and
an InGaAs imaging element that images a subject through the imaging lens.

15. An imaging apparatus comprising:
the imaging lens according to claim 1; and
an InGaAs imaging element that images a subject through the imaging lens.

16. An imaging apparatus comprising:
the imaging lens according to claim 2; and
an InGaAs imaging element that images a subject through the imaging lens.

17. An imaging apparatus comprising:
the imaging lens according to claim 3; and
an InGaAs imaging element that images a subject through the imaging lens.

18. An imaging apparatus comprising:
the imaging lens according to claim 4; and
an InGaAs imaging element that images a subject through the imaging lens.

19. An imaging apparatus comprising:
the imaging lens according to claim 5; and
an InGaAs imaging element that images a subject through the imaging lens.

* * * * *